United States Patent [19]
Blackmon et al.

[11] Patent Number: 5,150,748
[45] Date of Patent: Sep. 29, 1992

[54] ADVANCED SURVIVABLE RADIATOR

[75] Inventors: James B. Blackmon, Irvine; Robert E. Drubka, Huntington Beach; John S. Kirby, Long Beach; Dave Johnson, Riverside; R. Andrew Gerrick, Santa Ana; Thomas Ingersoll, Laguna Niguel; Nelson Jones, Huntington Beach; Brian Seaworth, Huntington Beach; Gary Glover, Huntington Beach, all of Calif.

[73] Assignee: McDonnell Douglas Corporation, Long Beach, Calif.

[21] Appl. No.: 539,135

[22] Filed: Jun. 18, 1990

[51] Int. Cl.$^5$ ............. B64G 1/50; F28F 13/18
[52] U.S. Cl. ..................... 165/41; 165/185; 165/904; 165/32; 165/181; 244/158 R; 244/163
[58] Field of Search ............ 165/185, 41, 133, 904, 165/181; 244/158 R, 163

[56] References Cited

U.S. PATENT DOCUMENTS

| | | | |
|---|---|---|---|
| 2,719,354 | 10/1955 | Dalin | 165/185 |
| 3,273,355 | 9/1966 | Hill et al. | 165/185 |
| 3,327,779 | 6/1967 | Jacoby | 165/185 |
| 3,653,942 | 4/1972 | Boebel et al. | 244/163 |
| 3,710,572 | 1/1973 | Herud | 165/185 |
| 3,913,666 | 10/1975 | Bayliss | 165/185 |
| 4,603,731 | 8/1986 | Olsen | 165/185 |

Primary Examiner—Albert W. Davis, Jr.
Attorney, Agent, or Firm—Gregory A. Cone; John P. Scholl

[57] ABSTRACT

A heat pipe radiator coating of a fibrous material provides protection for the radiator, such as a heat pipe, pumped loop, etc., while allowing good emissivity and heat rejection. Fibers are constructed from fiberglass, glass, quartz, saphire, diamond, carbon carbon, tantalum, stainless steel, aluminum, beryllium, and copper, and may be coated with a variety of metallic materials.

5 Claims, 4 Drawing Sheets

ADVANCED SURVIVABLE RADIATOR

BACKGROUND OF THE INVENTION

Thermal management of advanced space systems presents several problems, including the need for low mass, efficient heat rejection over a wide range of power loads, and the need for thermal control structures capable of heat removal from thermal loads of systems over wide temperature ranges.

Space radiators capable of high emissivity at moderately low operating temperatures coupled with low solar absorptivity, which are highly survivable and capable of withstanding both natural and hostile threat environments are therefore needed. Other considerations in such space radiators include a decreased payload mass, provision of high power conversion systems in space, extension of the operating temperature range of moderately low temperature radiators, and the provision of lightweight, highly survivable thermal management systems for the heat rejection radiator.

Current radiator designs for the power levels of interest use either pumped loops or heat pipe radiators. Pumped loop radiators are simpler and may be less massive, but for long duration missions, the inherent simplicity and redundancy of a heat pipe radiator, without moving parts, makes it more reliable, and is usually the design of choice for advanced systems. Near term space systems must reject approximately 1 kW to 10 kW of waste heat at temperatures of the order of 300 degrees K. to 400 degrees K. Advanced power systems will require radiators capable of rejecting hundreds of thousands of kilowatts at temperatures as high as approximately 1000 degrees K.

Because of the nature of their mission, these systems must also survive attacks from lasers, nuclear X-rays, and kinetic energy weapons, and withstand the natural space environment. Efficient radiators which can reject these thermal loads and survive these hostile threats are required in addition to the need for more effective radiators capable of long term operation in the natural space environment.

Efficient heat rejection requires that the radiators should have high infrared emissivity, and high thermal conductance throughout. For low temperature radiators, e.g., temperatures less than approximately 400 degrees K., low solar absorptivity is an important performance parameter. Additionally, the radiator must be highly reliable, have a low stowage volume for launch, withstand high g launch loads and maneuvers, and satisfy specific platform interface requirements. To survive the hostile threats, as well as the natural space environment, the radiator must be designed with carefully chosen combinations of materials. The laser threat demands that materials be able to withstand high temperatures and/or reduce the heat load by either reflecting, transmitting or absorbing and reradiating the incident energy. High laser reflectance is usually inconsistent with the requirement for high infrared emissivity, and heat pipe fluids effective at the temperatures of interest are not able to absorb the high laser fluxes expected for the strategic defense initiative systems. Therefore, the radiator design must somehow minimize the laser energy reaching both the working fluid and the thermal management system to which the radiator interfaces, and also keep the maximum temperature to which the heat pipe and fluid are exposed at an acceptable level.

The current technology for protecting the radiators from incident laser energy is in the form of rugate coatings on the radiator surfaces that are able to selectively reflect the laser radiation while maintaining high emissivity. However, these coatings are vulnerable to changes in laser wavelengths and are easily damaged and abraded by space dust and micrometeorites. Furthermore, the rugate coatings can not survive nuclear X-ray exposure at anticipated levels.

In general, nuclear X-rays pose a particularly stressing design requirement, since the X-ray absorption causes surface destruction by vaporization and high thermal stress shock loads transmitted through the exposed material. Low atomic number materials, also known as low Z materials, tend to absorb less X-ray energy. High atomic number, or high Z materials tend to absorb all of the nuclear X-rays within a thin layer of the material. Such total absorption initiates complex interactions leading to damage.

The kinetic energy weapon threat can either be a single large hypervelocity projectile of several grams, or a cloud of smaller hypervelocity debris, each particle having a mass of between 10 milligrams to 1 gram. For either threat it is impractical to armor the radiator to survive the impact. Instead, sufficient redundancy is included in the design to assure that the radiator can satisfy the heat rejection requirements after an attack. The space debris and micrometeoroid threat, however, includes very small particles, having a mass as low as 0.00001 gram with such large fluences that every pipe will suffer an impact during the lifetime of the platform. The radiator must be armored to survive these impacts and the emissivity of the surface maintained in spite of this constant surface abrasion, especially for long term missions.

Another consideration in the design of a radiator system is its vulnerability to the ambient environment consisting of atomic oxygen, and various forms of naturally occuring radiation. Materials for the radiator and any coatings need to be carefully chosen to avoid excessive performance degradation over periods of several years when exposed to the on orbit environment.

SUMMARY OF THE INVENTION

The advanced survivable radiator of the present invention addresses the issues enumerated above. The radiator shows unequaled survivability to natural and hostile threats. The high survivability attributes disclosed herein offer a significantly lower overall radiator system mass than a conventional shielded radiator system designed for the same threat levels. Following are some of the capabilities and advantages of the advanced survivable radiator.

The radiator system provides both high survivability potential and enhanced thermal performance with the use of a fibrous geometry. The fibrous structure provides the ability to withstand multiple hostile threats such as X-ray, laser and hypervelocity particles. There are several ways to employ the present invention to a radiative surface. In addition, there are several materials which can be employed in the invention, depending upon the type of performance desired and the manner in which the material is applied to a surface. Other uses include the use with a novel survivable thermal diode to minimize heat flux from the radiator to the thermal management system, and a separation/lift off arrangement where the fibrous material is lifted from the radiator surface for protection from laser threats. These characteristics provide enhanced protection while retaining high emissivity for normal operation, including post threat performance. Analyses of the advanced survivable radiator show acceptable heat pipe temperatures for specified laser threats, and survivability of the advanced survivable radiator protective radiating surface material especially with the lift off and thermal diode options.

The advanced survivable radiator configuration provides "standoff" for hypervelocity impact of kinetic energy weapon, micrometeoroid and small space debris/dust particles, in that the fibers are struck by the hypervelocity particles before they can strike the heat pipe surface or any other surface so protected by the advanced survivable radiator. "Standoff" offers this additional protection by inducing breakup, vaporization, and spreading of hypervelocity particles prior to impacting the radiator surface, which reduces the impact momentum and the momentum relative to the impact area. Thus, the advanced survivable radiator reduces the required radiator wall thickness and hence system mass. The material geometry enhances compliance and attenuation of impulse loads from particle impact. This geometry takes up the force which would otherwise be exerted on the radiator and thus decreases design load requirements of the heat pipes, and hence the heat pipe system mass.

In addition, the material geometry provides intrinsically high emissivity approaching a value of unity. This high emissivity enhances thermal performance of the radiator. Radiator performance is insensitive to degradation since emissivity is essentially constant over a wide range of fiber length to diameter ratios, and thus constant even if substantial damage, erosion, abrasion, or fiber breakage occur.

The material configuration may be configured with a protective metal film on the fibers. This film offers enhanced protection to atomic oxygen attack for certain materials such as carbon-carbon, as well as enhanced radiation heat transfer and laser survivability and shielding. Carbon-carbon is a fibrous material made by forming an acetate polymer chain, and then driving off the non-carbon species. In addition, the choice of materials allows for either low absorbance of nuclear X-ray energy, or, when the radiator is additionally employed as a shield, the materials can be selected to absorb all of the nuclear X-ray energy, thus protecting other parts of the spacecraft.

DETAILED DESCRIPTION OF THE PREFERRED EMBODIMENT

The advanced survivable radiator of the present invention involves the use of particular materials, arranged in a particular configuration, with demonstrated unprecedented survivability levels, as an outer protective covering for a radiating surface. The advanced survivable radiator utilizes a "brush" or "carpet" configuration and can be constructed from a range of materials.

Material options and typical radiator configurations using the advanced survivable radiator include the use of fiberglass, glass, quartz, saphire, tantalum, diamond, carbon-carbon, stainless steel, aluminum, beryllium, and copper. Diamond fibers may be formed from a thin film deposition, trimmed into a fiber shape. The fibers can be woven or brazed to substrate material.

Figure 1:
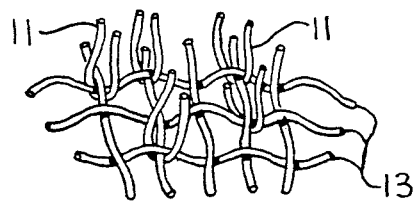
FIG. 1 is a perspective view of a metal mesh, wovenly fitted with the fibrous radiator surface of the present invention.

Referring to FIG. 1, the fibers 11 are shown as woven within and among a support matrix 13. Support matrix 13 can be made of beryllium, aluminum, stainless steel, titanium, as well as others. Additionally, support matrix 13 may be made of Nitinol, a trademarked alloy which, if deformed, returns to its original shape when heated.

The fibers 11 will have a length to diameter ratio of from about 5 to about 200. The fibers 11 will have a diameter range of from about from 100 microns to about 0.100 centimeter and length range of from about 0.1 centimeters to about 2 to 3 centimeters. The fibers 11 may be kinked or straight, as deviations in the specific shape do not cause a degradation in performance.

Figure 2:
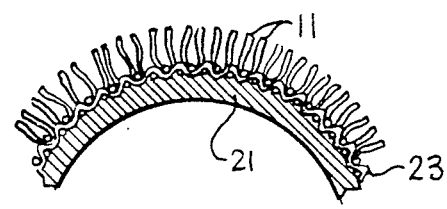
FIG. 2 is a perspective view of brazed attachment of the fibrous material of the radiator of the present invention to a metal surface.

As is shown in FIG. 2, the fiber material 11 may be attached to a metal surface 21 by a brazed layer 23. Brazing is a process where a thin layer of metal is heated to form a "solder-like" connection, in this case between the fibers 11 and metal surface 21.

Figure 3:
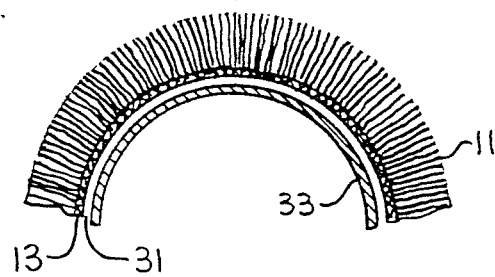
FIG. 3 is a sectional view of bonded attachment of the fibrous material of the radiator of the present invention to a metal surface.

Referring to FIG. 3, a bonding configuration is shown. Fibers 11 are joined to a support matrix 13. A bond layer 31, which may be rigid or flexible, joins the support matrix 13 to the external surface of a heat pipe 33. Ideally the bond layer 31 will be of a material which will readily transmit heat.

As previously mentioned, the advanced survivable radiator material, namely the fibers 11 can either be retrofitted to a standard radiator surface or can be integrated directly with a radiator surface, for example with the heat pipe itself. In the first approach, the material backing is brazed, soldered, or bonded to the radiating surface with the fibers 11 facing outward. Various low to moderate melting temperature metals can be used for attaching the advanced survivable radiator material to the heat pipe, and it is not necessary in principle that the material be bonded, since the purpose of having the advanced survivable radiator material intimately in contact with the heat pipe is to reduce the thermal resistance. Therefore, other means of assuring good thermal conductivity such as greases and pastes, etc may be used.

Figure 4A:
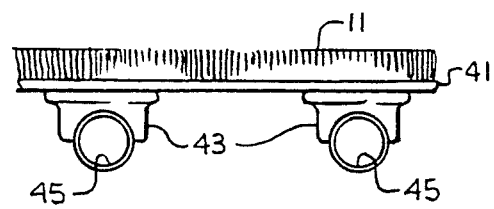
FIG. 4a is a sectional illustration of an armored heat pipe fin utilizing the fibrous shield of the present invention.
Figure 4B:
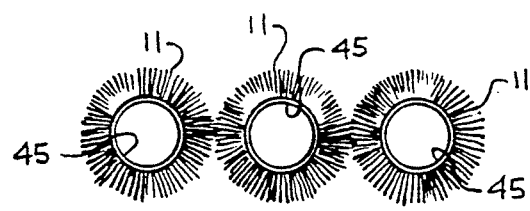
FIG. 4b is a sectional illustration of clustered heat pipes utilizing the fibrous shield of the present invention.
Figure 4C:
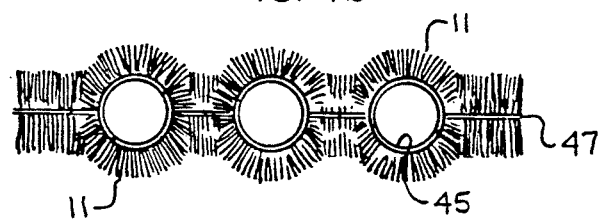
FIG. 4c is a sectional illustration of an finned heat pipe utilizing the fibrous shield of the present invention.

Referring to FIGS. 4a, 4b, and 4c, several configurations, based upon the types of construction illustrated in FIGS. 1-3 are illustrated. Each configuration shown in FIGS. 4a-c may be woven-bonded or brazed to the metal portions of the heat pipe. FIG. 4a illustrates fibers 11 attached directly to armored plate 41. Armored plate 41 is in turn connected to attachment plates 43, which are in turn connected to heat pipes 45.

FIG. 4b illustrates fibers 11 attached directly to a series of heat pipes 45. FIG. 4c illustrates fibers 11 attached directly to a series of heat pipes 45 and their connecting fin material 47.

Current heat pipe radiator designs are vulnerable to laser irradiation when coupled with other hostile and non-hostile threats such as: micrometeorite and debris damage, nuclear X-ray induced impulse blow off, and atomic oxygen induced oxidation, all of which cause degradation and loss of the thin optically reflective and high IR emissivity coating. This degradation leads to heat transmitted to the spacecraft and/or permanent heat pipe damage from excessive temperatures and high internal pressures generated. In extreme cases, these threats cause direct failure of the heat pipe, independent of the laser threat.

A method to decouple this irradiation from the heat pipe has been developed using the advanced survivable radiator. This method is called "Lift-off", and is detailed in FIGS. 5 and 6. Consider a single heat pipe covered with advanced survivable radiator material. Here the design is such that when the advanced survivable radiator material temperature exceeds a design threshold, it separates from the heat pipe. This separation is due to differential thermal expansion between the advanced survivable radiator material and the heat pipe it surrounds.

Figure 5:
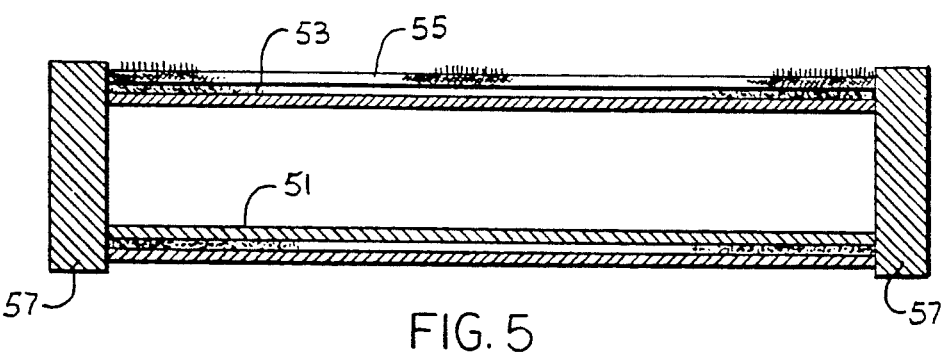
FIG. 5 is a longitudinal cross section of a heat pipe with the fibrous material of the present invention bonded, as by soldering or brazing, to the radiator material.

Referring to FIG. 5, a longitudinal sectional view of the shielded radiator of the present invention is shown. At the centermost portion, the heat pipe wall 51 provides a conduit for condensation, or other heat pipe internal activity. A bonded layer 53 provides support for survivable radiator layer 55. Here, the bonded layer does not rigidly fix radiator layer 55 to wall 51, but provides heat transfer contact between radiator layer 55 and wall 51. At the ends of the wall 51, a pair of anchors 57 rigidly fix the ends of survivable radiator layer 55 to the wall 51.

Figure 6:
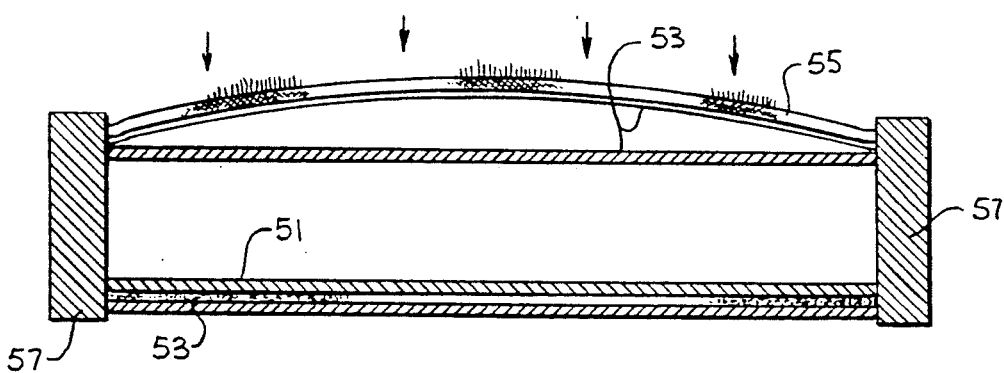
FIG. 6 is a longitudinal cross section of a heat pipe illustrating the lift-off action which occurs when fibrous material is excessively heated, causing the brazing to melt, creating a space between the heat pipe material and the fibrous material.

Referring to FIG. 6, the longitudinal sectional view of the shielded radiator of FIG. 5 is shown immediately after exposure to a massive energy input, such as the energy from a high power laser. Arrows above the surface indicate the influx of laser energy. Note that the bonded layer 53 at the top of the FIG. has separated allowing the radiator layer to "bow" outwardly and away from the heat pipe wall 51.

Note that the bottom portion, which has not been irradiated, does not "bow" away from the heat pipe wall 51. The bottom portion continues to reject heat from the heat pipe 51. The space formed by the "bow" at the top of the pipe 51 insulates pipe 51 from direct contact with the elevated temperature inner surface of the radiator layer 55. Thus, as radiator layer 55, in the case of a continuous incoming heat flux, continues to heat up, the heat pipe 51 will be protected from sudden thermal influx and thermal shock.

The advanced survivable radiator material can have bimetallic inserts or have an alloy woven into its base. Nitinol, a shape memory alloy which can be deformed, and which returns to its original configuration when raised above a known minimum temperature would be most advantageous as a base weave material.

The separation during "lift-off" decouples the direct thermal conduction from the outer material to the heat pipe and results in a radiation path through a space with greatly increased thermal resistance. This enhanced resistance is typically two orders of magnitude increase in thermal resistance. The bulk of the energy is absorbed by the outer advanced survivable radiator surface, which is then reradiated in all directions at the higher temperature of the advanced survivable radiator material. As a result, the heat pipe experiences only a minor increase in temperature, especially if the emissivity of the internal separated surfaces can be minimized. Upon cooling, the outer surface reattaches to the heat pipe for normal operation, as the surface cools and the bond material solidifies.

The ability of the outer surface to "Lift-off" is a function of the thermal expansion coefficients of the advanced survivable radiator material and the heat pipe material, the bonding material used.

Figure 7:
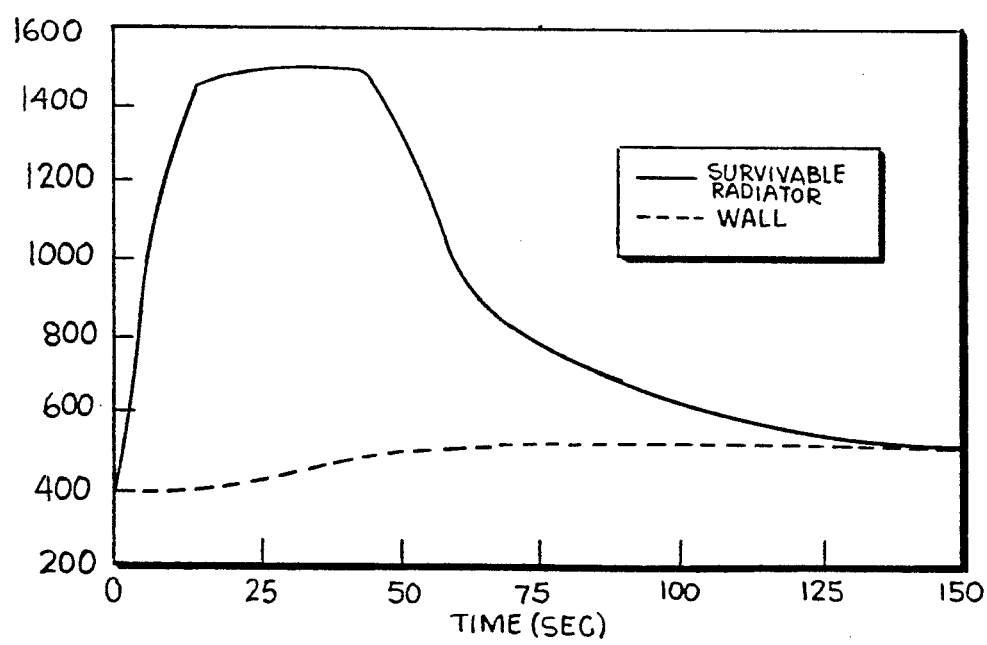
FIG. 7 is a sectional illustration of the operation of a thermal diode under normal conditions.

Lift off has been practiced with samples consisting of Copper or Stainless Steel Screening attached to carbon-steel plates with and without a solder bond which were placed in an oven and exposing them to a graphite heater with an intensity of approximately 20 W/cm$^2$, to simulate laser radiative heating. The test result is shown in FIG. 7. The lift off phenomenon occurs quickly and returned to its original geometry upon cooling with only minor distortions.

This phenomenon is illustrated in FIG. 7. For an influx of thermal energy of about 40 to 50 seconds, the survivable radiator layer 55 rapidly heats up to a temperature of about 1400 degrees Kelvin in about 15-20 seconds. During this time, the temperature of the heat pipe wall 51 of FIGS. 5 and 6 is relatively unaffected. Once the influx of radiative heat has ceased at about 45 seconds, the radiator layer 55 begins to rapidly cool. At about the 75 second mark, the heat pipe wall 51 begins to exhibit a slight rise in temperature.

This slight rise in temperature corresponds to the decay in temperature of the radiator layer 55. At 150 seconds, the heat pipe wall 51 temperature is somewhat elevated, but by not more than about 50% of the initial value, and certainly not anywhere near the value of 275% attained by the radiator layer 55.

Another use of the present invention for improving the capability of an advanced survivable radiator is the incorporation of a "thermal diode" into the system for protection of components from the threat of laser energy. A thermal diode could be constructed using a low thermal conductivity bi-porous material, such as a ceramic, hermatically sealed so as to prevent the escape of liquid or vapor placed with the bi-porous material.

The combination of low thermal conductivity bi-porous material and low thermal conductivity gas would insulate the sensitive lower surface from the laser energy and greatly increase its survivability. The theory behind the thermal diode is very similar to the advanced survivable radiator-liftoff apparatus and method detailed above in that both methods result in an increase of thermal resistance between the external heat and the sensitive surface.

Figure 8:
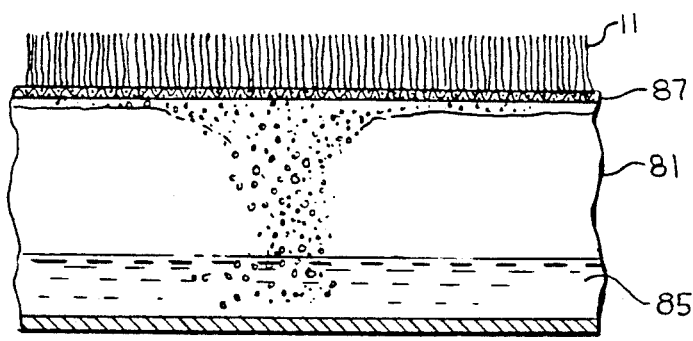
FIG. 8 is a sectional illustration of the operation of a thermal diode during rapid heating.

FIG. 8 shows a cross section of the thermal diode and illustrates normal and laser irradiated behavior. A conduit 81 forms the "boundary" of the diode. Fibers 11 may be mounted atop the diode to enhance its performance. Again, the fibers 11 may be attached by any of the means previously mentioned. Heat from a source beneath the conduit 81 causes the fluid 85 within the conduit 81 to vaporize. Fluid 85 condenses against the upper portion of the conduit adjacent fibers 11, as is represented by layer 87. As the fluid 85 condenses, heat is rejected through fibers 11.

When in normal operation the liquid layer would be evaporated by heat from the space system, Q and the vapor would travel through the large pores of the bi-porous material, its path of least resistance, to the cooler top surface where it would condense and be carried back towards the bottom by capillary forces. The cycle continued in this manner and transfers heat from the hot lower surface to the cool upper surface to be radiated away. A thermal diode layer could be used underneath the carpet-like advanced survivable radiator described above.

Figure 9:
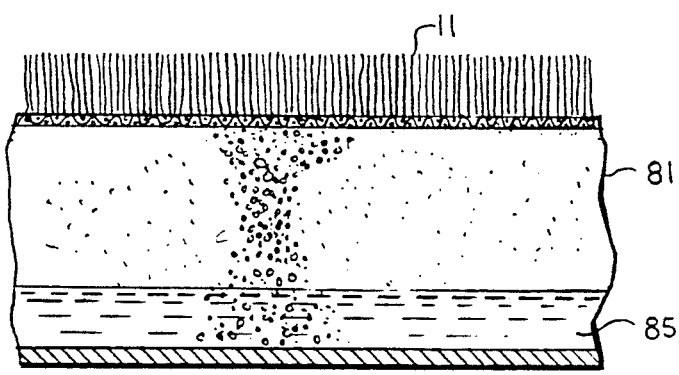
FIG. 9 is a graph of temperature versus time for the lift-off action illustrated in FIGS. 7 and 8, illustrating the temperature of the heat pipe and the fibrous material.

When a thermal diode is exposed to a large external heat load applied to the upper surface caused by laser or other means, the condensing liquid quickly evaporates and forms a gas barrier between the now hot upper surface and the lower surface. FIG. 9 illustrates such a radiative heat flux introduced into fibers 11 which cause the heating of the upper portion of conduit 81, and thus the vaporization of layer 87. Once this vaporization takes place, further influx of heat toward the bottom of conduit 81 is inhibited.

Thermal Performance Analysis

The decision to use the advanced survivable radiator to cover heat rejection surfaces depends not only on its survivability capabilities, but also on its impact on radiator thermal performance. An optimal advanced survivable radiator configuration is one which meets anticipated survivability requirements and maintains or enhances radiator thermal performance while minimizing radiator mass. In addition, the configuration disclosed herein can be used with radiators for which hostile threats are not a concern.

A thermal model was developed for the advanced survivable radiator to identify critical parameters and key developmental issues. Our analyses and test results show that proper selection and application of advanced survivable radiator can enhance radiator thermal performance under normal operating conditions.

It is found from this model that the ratio of heat transfer from a radiator with (/w) and without (w/o) advanced survivable radiator is approximated by:

$$\frac{Q_{(/w)}}{Q_{(w/o)}} = \frac{e_{(/w)}}{e_{(w/o)}} f_g E \left[ 1 - \frac{dT}{T} \right]^4 \quad (1)$$

where $e_{(/w)}$ is the effective emmissivity of the advanced survivable radiator surface, $e_{(w/o)}$ is the emmissivity of the bare radiator surface, $f_g$ is the geometry factor, also known as the view factor, a function of the extent that a surface "sees" or reradiates upon itself, E is an effective fin efficiency of the advanced survivable radiator fibers, and dT is an effective temperature drop from the radiator surface to the base of the fibers. Four factors govern the impact of advanced survivable radiator on thermal performance: emissivity ratio, geometric factors, effective fin efficiency of the fibers, and thermal characteristics of the advanced survivable radiator weave material and attachment technique. The first two factors act to enhance radiator thermal performance and can be estimated qualitatively prior to a detailed thermal analysis by closer examination of each of these factors and bracketing their anticipated range.

The advanced survivable radiator surface, although composed of many fibers arranged as with a brush, carpet, or "pile" surface, can be considered to be comprised of numerous small cavities. Multiple reflections within a cavity act to enhance the emissive power of the cavity relative to that of a plane surface of identical temperature and emittance stretched across its opening.

Figure 10:
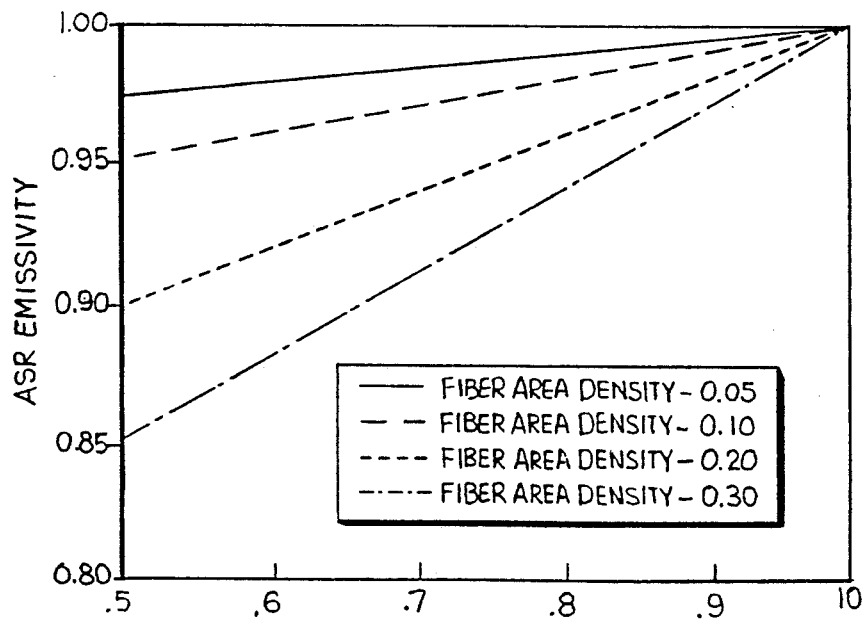
FIG. 10 is a graph of total shielded radiator emissivity versus the emissivity of the fibrous material during normal operation.

For the fiber densities, fiber materials, and fiber length to diameter ratios under consideration, effective advanced survivable radiator emissivities near unity are readily achievable using materials of substantially lower intrinsic emissivity, as indicated in FIG. 10. This geometric enhancement of emissivity gives rise to an effective emissivity ratio in equation (1) larger than one and tends to increase thermal performance substantially. For fibers with a diffuse surface, the apparent emissivity increases with fiber length reaching an asymptotic value at fiber lengths longer than two to three fiber diameters. For fibers with a specular surface, the apparent emissivity increases with increasing fiber length to an asymptotic value of one, typically at fiber lengths larger than four or five fiber diameters. The effective advanced survivable radiator emissivities near unity for various carbon fiber and steel fiber models of the advanced survivable radiator have been measured, providing proof of the radiator performance enhancement.

Referring to FIG. 10, a plot of the emissivity of the survivable radiator layer, for example, layer 55 of FIG. 5, is plotted versus the emissivity of the fibers 11, also as shown in previous FIG.s. The graph illustrates the fact that fiber emissivity is related to total emissivity, but a degradation of fiber emissivity will not spoil the emissivity of the system.

Figure 11:
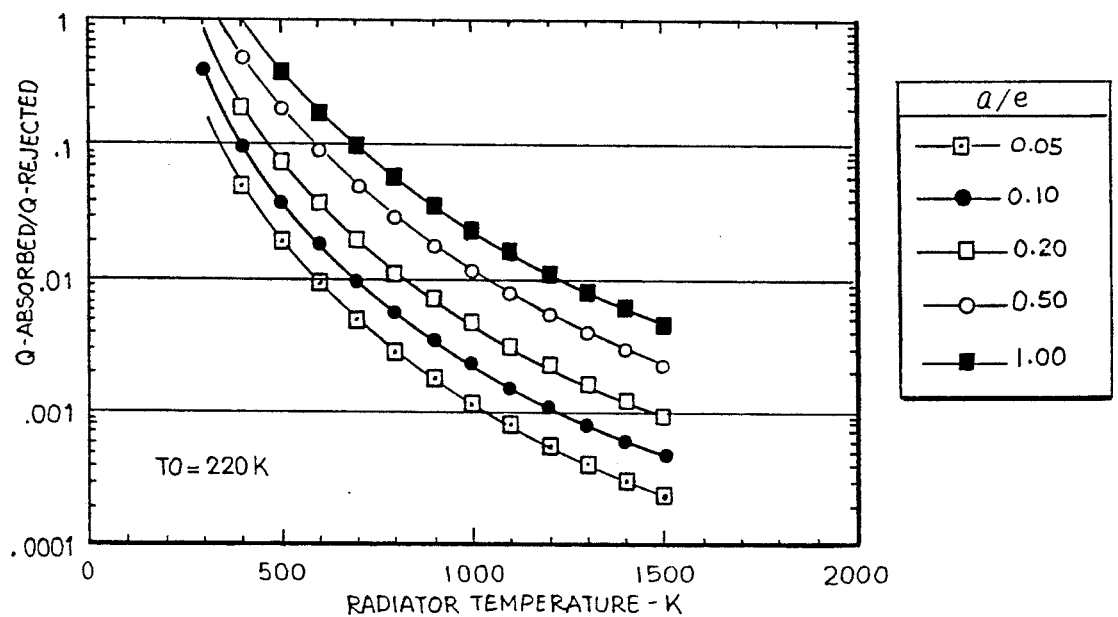
FIG. 11 is a graph of the absorption/rejection ratio versus radiator temperature for five different types of material; and, FIG. 12 is a graph of input power versus temperature for the shielded radiator of the present invention, illustrating both observed and theoretical data.

Spacecraft are usually designed to have the solar absorptivity and infrared emissivity of their thermal control surfaces in a specific range. For radiator applications where it is important to radiate as much heat as possible to space while absorbing as little solar radiation as possible, a low absorptivity/emissivity rate, on the order of 0.2 or less, is desirable as is illustrated in FIG. 11. Note that "a" is the absorptivity in the solar spectrum, and "e" is the emissivity in the infrared region corresponding to the temperature of the radiator. Higher values of "a/e" are acceptable as the radiator temperature increases, since the relative amount of solar energy absorbed decreases as the radiator temperature increases.

FIG. 11 is a plot of the absorption/rejection ratio versus temperature for various values of a/e. At higher temperatures, much more radiative heat is rejected than absorbed, but the magnitude of the ratio is dependent upon the a/e ratio. The curve of a/e of 0.05 gives the greatest rejection efficiency of the 5 curves.

The geometric effects observed in equation (1) arise from an increase in effective radiation area when advanced survivable radiator is applied to non-planar surfaces. For example, the effective increase in heat transport for a cylindrical geometry is:

$$f_g = (1 + 2L/D) \quad (2)$$

where $f_g$ is again the geometry or shape factor, L is the fiber length and D is the cylinder diameter. For a one inch diameter heat pipe covered with a one-half inch layer of advanced survivable radiator, $f_g$, the geometry factor, $=2$. This improvement is reduced when the radiation view factor between pipes is high, but for many radiator configurations there is an additional improvement in performance due to this geometric effect.

The fin inefficiencies and bonding resistance act to decrease advanced survivable radiator thermal efficiency. Fin efficiency is a function of conductance parameter N. This parameter is the ratio of the radiation transfer coefficient to the conduction transfer coefficient. These coefficients are defined as:

$$K_R = s\, T_B^3\, e_{(/w)}\, .78539\, d^2 \quad (3)$$

and $$K_C = .78539\, d^2 \frac{k}{L} \quad (4)$$

These coefficients when combined into a dimensionless conduction parameter yield:

$$N = \frac{s\, e_{(/w)}\, T_B^3\, L}{k} \quad (5)$$

In equations 3, 4, and 5, $T_B$ is the fiber base temperature in degrees Kelvin, L is the fiber length, k is the fiber thermal conductivity, d is the fiber diameter and s is the Stefan-Boltzmann constant, and $e_{(/w)}$ is the emissivity of the survivable radiator. The 0.78539 factor is equal to the quantity pi divided by 4. The actual functional dependence of fin efficiency E, with E changing as a function of N will result from a detailed advanced survivable radiator thermal model.

It can be shown, however, from simple extended fin radiator studies, that fin efficiency E, increases with decreasing values of N. Efficiency can therefore be maximized with high conductivity fibers, optimized fiber lengths, and radiator temperatures that are below values sufficiently high to cause N to be significant, such as an N of the order of about 0.01. As an example, for an advanced survivable radiator configuration employing copper fibers, one inch in length with a length to diameter ratio of 10, and at a temperature of 350° K., the value of N is on the order of $10^{-4}$ and is characteristic of a fin efficiency near unity.

This implies that the high conductivity fibers are effectively at a uniform temperature, thus improving radiator performance. Even for radiator temperatures of 900° K., a relatively high temperature for space radiators, N is on the offer of $10^{-3}$ and a near unity fin efficiency is anticipated. This effect has been experimentally verified.

An important issue with any particular embodiment of the invention will be the minimization of the thermal resistance between the radiator surface and the base of the fibers. This thermal resistance includes the contact resistance associated with the attachment technique along with the conduction through the weave or fiber based material.

This thermal resistance is particularly important because of the fourth power dependency of the effective temperature drop across the advanced survivable radiator radiator interface. The advanced survivable radiator of the present invention minimize this contact thermal resistance effect and the optimized configurations disclosed herein will maintain or enhance overall radiator thermal performance.

Initial tests were performed to validate the advanced survivable radiator, reduce to practice the disclosed invention, and highlight the key features identified in our thermal models discussed above. Advanced survivable radiator models covering a wide range of fiber thermal conductivity were fabricated. One configuration was constructed from circular carbon steel wire brushes compressed together to form a 3 inch diameter radiator model 7 inches in length, with a fiber area density of approximately 20%. The second configuration employed low thermal conductivity carbonized rayon fibers, 1 inch in length, woven into rayon backing and bonded to a 3 inch diameter copper tube using Devcon F, a trademark name for an aluminum based thermal paste, for a first model, and a thermal adhesive sheet for a second model.

Emissivity tests were performed on five carbonized rayon models of a typical heat pipe radiator with an advanced survivable radiator protective surface, with fiber lengths ranging from 0.2 to 1 inch. Measured values of emissivity greater than 0.98 over the range of output radiative wavelengths of from 3-13 microns.

The 3-13 micron wavelengths for which relatively low noise measurements of emissivity were taken correspond to the peak spectral emissive power wavelength for a 200° K. radiator temperature. The 3 micron wavelength limit corresponds to a 1500° K. radiator temperature. Minimizing the solar absorptivity or the amount of solar energy absorbed by the radiator is a key issue in this survivable radiator invention for low temperature radiator operation, as it is with all space radiators.

Heating of the radiator model was provided by a cylindrical electrical resistance heater inserted into the inner diameter of the wire brush, and a quartz lamp located symmetrically inside the copper pipe of the carbonized rayon model. These techniques simulated the actual radiator heat pipe or pumped loop. Uniformity was enhanced in the latter case through the use of a high thermal conductivity copper surface and coating the inner and outer surfaces of the pipe with a high emissivity paint. Both methods of heating generated a nearly uniform model temperature over a wide range of input powers.

The radiator models discussed above were tested separately in a large glass bell jar at vacuum levels of 10 mTorr to determine their radiation heat transfer characteristics and performance. Correcting these results to account for bell jar temperature variations, optical characteristic, sample heat losses through end effects and the cabling yielded sufficient accuracy, to within 10%, to enable validation of the physical principles involved.

Figure 12:
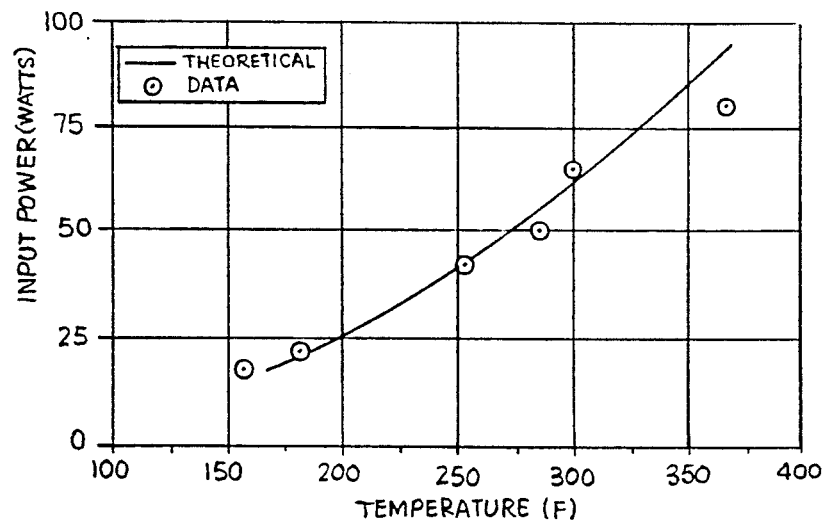

An example of the data obtained with the wire brush model is illustrated in FIG. 12 together with predictions based on the geometry of the test setup and ideal advanced survivable radiator performance including a fin efficiency of unity, and zero contact resistance. This agreement shows that enhanced radiator performance is gained by the advanced survivable radiator disclosed herein.

FIG. 12 is a plot of the input power versus temperature for the survivable radiator of the present invention. This curve is for the non-lift-off version of the invention wherein the temperature resulting from an input is the steady state temperature. A qualative measure of fiber fin efficiency is the effective temperature drop along the length of the fiber. An isothermal fiber has a fin efficiency of one. The introduction of a temperature gradient along the fiber decreases its fin efficiency. The data from the above experiments were used to estimate the effective temperature drop from the radiator surface to fiber ends of the advanced survivable radiator material. The results illustrate that thermal performance of the advanced survivable radiator performance is not degraded when the conductance parameter N is less than $10^{-3}$. For materials and fiber geometries under consideration, these values are on the order of $10^{-4}$ even at 900° K. Therefore, the advanced survivable radiator will improve the thermal performance of space radiators used for even the very high rejection temperatures associated with high temperature power systems, such as thermionic power systems.

In terms of hypervelocity particle impact protection, the advanced survivable radiator of the present invention offers enhanced protection of the radiator to both the long term surface erosion effects of fine hypervelocity particles encountered in orbit ranging in size from "space dust" to the micrometeorite and small kinetic energy weapon particles. The fibers would cause breakup and vaporization of incoming particles before they impact the surface of the radiator pressure boundary. The length of the fibers 11 offers a "stand off" distance. Thus, the degree of damage would be reduced, similar to the "bumper/catcher" designs used to protect spacecraft from high velocity particle impact. In the "bumper/catcher" scheme, the "bumper" causes particle breakup and vaporization, the remnants spread apart, and then strike a "catcher" plate that provides the remaining protective shield.

The survivable radiator of the present invention could be used with all spacecraft radiators, thermal control systems, radiators and other protective surfaces designed to withstand multiple hostile threats and/or the natural space environment. It would also be useful for low temperature radiators requiring high IR emissivity and low solar absorptivity. In addition, terrestrial radiators having both convection and radiation heat transfer mechanisms, as with a wide variety of industrial and power utility applications, could utilize the device and method of the present invention.

Its utility is derived in part because it achieves exceptionally high effective emissivity by optimum combination of materials and configuration, thus enhancing radiator performance. In particular, the novel use of the "carpet" of fibers intrinsically increases the emissivity over that of the material itself. The device and method of the present invention achieves exceptionally high survivability to laser threat through the employment of "lift-off", which reduces laser energy transmitted from the outer advanced survivable radiator surface to the heat pipe or radiator tube or fin, since the conduction of heat is minimized and radiation is the dominant, relatively limited mechanism.

Employment of the thermal diode effect, which also reduces energy conducted from the surface to the heat pipe or radiator tube or fin yields additional protection. In addition, the thermal diode can be used to connect the fin to the tube and the tubes to the header or manifold, and provide additional protection from threat radiation.

In normal operation the device and method of the present invention achieves low solar absorptivity, especially important for low temperature radiators. In the steady state current space environment the invention achieves high survivability to hypervelocity particle impact by providing "stand off" distance. Incoming particles are broken up, vaporized, and dispersed before striking radiator pressure boundary, thus reducing impact damage.

The survivable radiator maintains excellent emissivity, and where required, low solar or laser absorptivity, despite damage and loss of fibers due to particle impact. Emissivity values approaching 1.0 are achieved with length to diameter ratios of 5-10, and thus slightly higher L/D ratios can achieve high end-of-life emissivity values with a very small increase in mass.

The survivable radiator also exhibits enhanced nuclear x-ray survivability and can withstand extremely high temperatures by proper choice of high temperature materials. The radiator also achieves high IR emissivity for radiating waste heat while minimizing solar absorptivity.

The fibers 11 may be made of a wide array of materials including fiberglass, glass, quartz, saphire, diamond, carbon-carbon, stainless steel, aluminum, beryllium, and copper fibers. The cladding may be selected from the group consisting of various metals including beryllium, copper, aluminum, steel, nickel, tungsten, titanium, and gold. As previously stated, the two main methods for attachment include dip brazing of fibers onto fins and tubes, and the woven method whereby a metallic "carpet" is brazed, bonded or soldered onto heat pipe tube and fin.

The forgoing disclosure and description of the invention are illustrative and explanatory thereof, and various changes in the materials of construction, physical configuration, types of heat rejection mechanism, materials utilized for the fibers, and coating thereof, their size, shape and properties, as well as in the details of the illustrated embodiments may be made without departing from the spirit and scope of the invention.

What is claimed is:
1. A spacecraft heat rejection system comprising:
a space vehicle having an excess of thermal energy;
a metallic surface attached to said space vehicle;
a braze material bonded to said metallic surface; and,
a multiplicity of elongate fibers each having a first end secured within said braze material and a second end extending away from said braze material, and wherein said multiplicity of elongate fibers are made from a material selected from the group consisting of:
fiberglass;
glass;
quartz;

saphire;
tantalum;
diamond;
carbon carbon;
stainless steel;
aluminum;
beryllium; and,
copper.

2. The survivable radiator of claim 1 wherein said fibers are clad with a material selected from the group consisting of:
beryllium;
copper;
aluminum;
steel;
stainless steel;
tantalum;
nickel;
tungsten;
titanium; and,
gold.

3. A spacecraft heat rejection system comprising:
a section of the spacecraft from which section heat is to be removed;
a woven support matrix having an inner surface facing the section of the spacecraft and an outer surface;
a multiplicity of elongate fibers woven into said support matrix such that at least one end of each fiber extends outwardly away from the outer surface of the support matrix, wherein the fibers are made from a material selected from the group consisting of fiberglass, glass, quartz, sapphire, diamond, carbon carbon, stainless steel, aluminum, beryllium, copper and combinations thereof; and
a thermally conductive bonding layer attaching the support matrix to the section of the spacecraft.

4. The system of claim 3 wherein the woven support matrix is selected from the group consisting of beryllium, aluminum, stainless steel, titanium, Nitinol, and combinations thereof.

5. The system of claim 3 wherein the elongate fibers are clad with a material selected from the group consisting of beryllium, copper, aluminum, steel, nickel, tantalum, stainless steel, tungsten, titanium, gold, and combinations thereof.

* * * * *